United States Patent
Lesueur

(10) Patent No.: US 7,891,968 B2
(45) Date of Patent: Feb. 22, 2011

(54) MOLD BASE FOR MOLD MANUFACTURING THERMOPLASTIC CONTAINERS, AND MOLDING DEVICE EQUIPPED WITH AT LEAST ONE MOLD PROVIDED WITH SUCH A BASE

(75) Inventor: Francois Lesueur, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 504 days.

(21) Appl. No.: 11/992,789

(22) PCT Filed: Oct. 13, 2006

(86) PCT No.: PCT/FR2006/002312

§ 371 (c)(1),
(2), (4) Date: Mar. 28, 2008

(87) PCT Pub. No.: WO2007/045749

PCT Pub. Date: Apr. 26, 2007

(65) Prior Publication Data

US 2009/0263534 A1   Oct. 22, 2009

(30) Foreign Application Priority Data

Oct. 17, 2005   (FR) .................................. 05 10561

(51) Int. Cl.
*B29C 49/48* (2006.01)

(52) U.S. Cl. .................. 425/522; 425/470; 425/525

(58) Field of Classification Search .......... 425/470, 425/522, 525

See application file for complete search history.

(56) References Cited

U.S. PATENT DOCUMENTS

| 4,785,950 | A | * | 11/1988 | Miller et al. ................. 215/375 |
| 5,072,841 | A | | 12/1991 | Okhai et al. |
| 5,320,230 | A | * | 6/1994 | Hsiung ........................ 215/375 |
| 5,664,695 | A | * | 9/1997 | Young et al. ................. 215/375 |
| 5,850,932 | A | | 12/1998 | Beck et al. |
| 5,988,416 | A | | 11/1999 | Cheng et al. |
| 6,085,924 | A | | 7/2000 | Henderson et al. |
| 6,276,546 | B1 | | 8/2001 | Davis et al. |
| 2001/0001200 | A1 | | 5/2001 | Zhang |

FOREIGN PATENT DOCUMENTS

| EP | 0 440 964 A | 8/1991 |
| EP | 0 629 555 A | 12/1994 |
| EP | 0 703 152 A | 3/1996 |
| WO | WO 99/07607 A | 2/1999 |
| WO | WO 03/091117 A | 11/2003 |

* cited by examiner

*Primary Examiner*—Robert B Davis
(74) *Attorney, Agent, or Firm*—Sughrue Mion, PLLC

(57) ABSTRACT

A mold base for a blow- or stretch-blow molding of thermoplastic containers having a petaloid base with 5 stems which are separated by radiating troughs with convex radially curvilinear base, the base being connected to a body with a diameter Φ of 85 to 95 mm; the base includes 5 cavities separated by radiating ridge lines with concave radial ridge having a radius of 2 to 5 mm; the bases of the cavities have each a width of 1.5 to 3.5 mm and are distributed over a circular contour of diameter of base D of 60 to 66 mm; the height of the ridge line is 16.5 to 18 mm; the flanks of the ridge lines are axially concave and the tangent planes at origin form an angle of 52° to 88°.

8 Claims, 3 Drawing Sheets

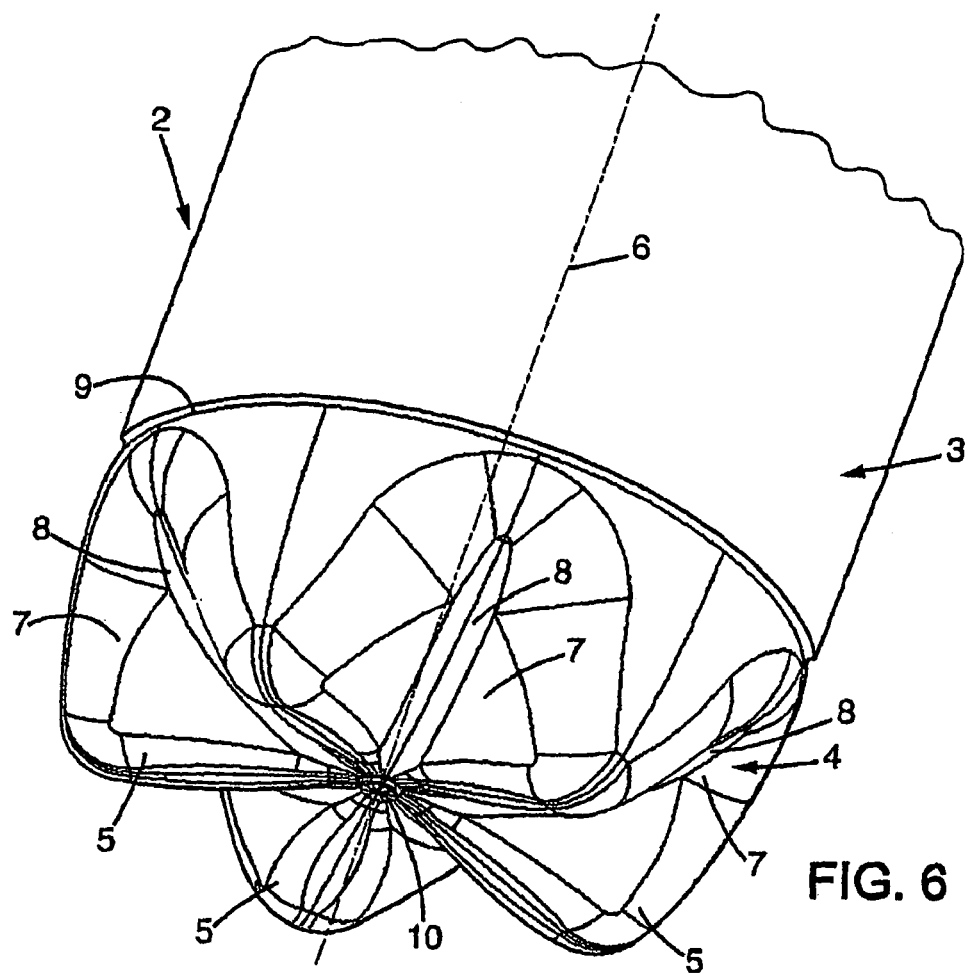
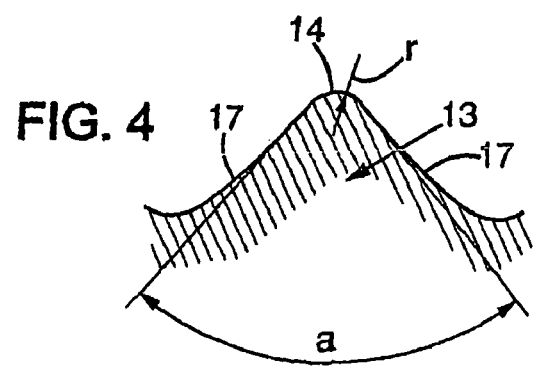

MOLD BASE FOR MOLD MANUFACTURING THERMOPLASTIC CONTAINERS, AND MOLDING DEVICE EQUIPPED WITH AT LEAST ONE MOLD PROVIDED WITH SUCH A BASE

FIELD OF THE INVENTION

The present invention relates in general to the field of the manufacture, by blow-molding or stretch-blow-molding, of containers, particularly bottles, made of thermoplastic such as PET.

More specifically, the invention relates to improvements made to the design of a mold base for a mold for the manufacture, by blow-molding or stretch-blow-molding, of containers, particularly of bottles, made of thermoplastic such as PET, said containers having a body and having a base of the type said petaloid with five feet which are distributed angularly with uniform spacing, which run approximately parallel to the axis of the container and which are separated from one another by radiating valleys the bottoms of which run radially with a convex curvature, which container base connects with the container body in a connection region that is substantially of a cylinder of revolution having a diameter $\Phi$ of about 85 to 95 mm, said mold base comprising, for molding said container base, five cavities which are distributed angularly at even distances apart, run approximately parallel to the axis of the mold base and are separated from one another by radiating dorsal fins the crests of which are concave, the bottoms of said cavities being distributed over a substantially circular contour with a basic diameter D ranging between about 60 and 66 mm.

The term "dorsal fin" is intended here to denote a protruding part, which is substantially radially elongate, of the mold base which, in the base of the molded container, leads to the formation of an aforesaid "valley" separating two consecutive feet.

BACKGROUND OF THE INVENTION

The part of the containers that is the most difficult to manufacture is the base. It is effectively the base which supports the weight of the column of liquid contained in the container and, if it has insufficient mechanical strength, it loses its shape and the container can no longer stand in a stable manner on a support.

Now, the base, specifically in order for it to be able to have the desired mechanical strength, has an appreciable wall thickness, that is proportionately greater than that of the rest of the container. This means that, in relative terms, it requires more material than the body of the container the wall of which has currently been reduced down to a very small thickness that is becoming difficult to reduce further. The base is therefore that part of the container in which reductions in thickness, and therefore savings in thermoplastic, can still be envisioned.

What is more, the base is the region of the container that is the most difficult to shape correctly in the blow-molding or stretch-blow-molding operation, specifically because the appreciably greater thickness of material makes it slower to stretch and less easy to shape. Now, to improve its mechanical strength, the base generally has a complex or even very complex shape with numerous recessed and protruding features the correct shaping of which leads to the desired mechanical strength.

These difficulties and disadvantages, which are of a general nature, are further aggravated in containers that have complex shaped bases with multiple projecting feet known as "petalloid" bases. Indeed, these petalloid bases have, around the periphery, an alternation of substantially axial projecting lumps that form the feet and of recesses or "valleys" which separate them and the bottoms of which run radially approximately over a hemispherical envelope: the stretching, particularly in the axial direction, of the material during the blow-molding process is therefore done to extents which vary very widely according to whether the region concerned is in a foot or in a valley. Now, at all points on the base, the mechanical strength has to be high enough to prevent the base from collapsing under the action of the weight of liquid and the internal pressure (this type of container often being used to contain carbonated liquids), this being obtained by providing a substantially increased thickness of material. Furthermore, the complex shape of petalloid bases requests tight control over the blow-molding conditions, particularly the blowing pressure, in order to be able to shape the bases correctly.

Furthermore, manufacturers of thermoplastic containers are constantly seeking to improve the economic production conditions by attempting to produce containers that require a smaller amount of thermoplastic, and at ever-increasing production rates.

It is specifically an object of the invention to meet these requirements of everyday practice and to propose a technical solution that is improved with regard to the manufacture of the base of the containers, which is capable of leading to appreciable savings in raw materials and at the same time to an appreciable increase in production rates.

SUMMARY OF THE INVENTION

To these ends, according to the first of its aspects, the invention proposes a mold base for a mold for the manufacture, by blow-molding or stretch-blow-molding, of containers, particularly of bottles, made of a thermoplastic such as PET, as mentioned in the preamble, which mold base, being designed according to the invention, is characterized by the combination of following features:
- the base of each cavity, adapted for forming a bearing surface of a foot of the container, has a width l, measured parallel to the periphery, of between about 1.5 and 3.5 mm;
- each dorsal fin has a dorsal fin crest radius r of between about 2 and 5 mm;
- each dorsal fin has flanks which are concave in an approximately axial direction and of which the planes tangential to the origin form an angle a of between about 52° and 88°; and
- the height H of the dorsal fin ranges between about 16.5 and 18 mm.

The term dorsal fin height H is intended here to denote the height of the crest of the dorsal fin vertically in line with the contour having the aforementioned basic diameter D.

As a preference, provision is made for the flanks of the dorsal fins furthermore to be concave in the radial direction, so that the container base valley flanks obtained with this mold base are curved in three dimensions.

Also as a preference, provision is made for the crests of the substantially concave radial dorsal fins to extend over a surface of revolution the cross section of which is substantially in the shape of a basket handle, in particular substantially oval. By virtue of this arrangement, the dorsal fin height H is substantially reduced by comparison with the height this dorsal fin would have if the crests of the dorsal fins were to be rested on a hemispherical surface.

The fact to adopt, according to the invention, a cavity bottom width l as small as 1.5 to 3.5 mm surely runs counter to the solution conventionally adopted which is to have a more substantial cavity base width, typically of at least 6 mm: wide cavities make it easier to remove the air trapped between the wall of the mold and the wall of the foot of the container during blowing, allowing the thermoplastic wall that is in the process of being deformed to actually reach the wall of the mold and therefore making it possible to obtain a container with correctly formed feet.

Surely, as such, cavities of narrow width as recommended in the context of the present invention make the feet more difficult to blow-mold into their correct shape. However, with the reduction in the width of the bottoms of cavities the invention combines a reduced dorsal fin height of between about 16.5 and 18 mm, as opposed to a height in excess of 18 mm in a conventional mold: the deforming of the thermoplastic which on the one hand is made more difficult in the bottoms of the cavities because of the narrower width of said bottoms is, by contrast, made easier in the region of the dorsal fins because of the shorter height of the dorsal fins. In addition, the concave shape of the dorsal fin flanks and the very wide angle of 52° to 88°, as opposed to an angle of the order to 49° in current designs, of the dorsal fin flanks also make a positive contribution.

Finally, the overall end-result provided by a mold base designed according to the invention is due to a container base that is molded more accurately and is better able to withstand pressure and heat.

A typical example corresponds to the combination of following values:
Φ=87.9 mm
l=1.94 mm
r=3.5 mm
a=80°
H=16.7 mm Advantageously, provision may be made for the cavities to have a radius Rg of between about 5 and 10 mm, and preferably of about 8.5 mm.

It will be emphasized here that, aside from the advantages listed above which are procured by virtue of the implementation of the features according to the invention, a container base manufactured using a mold having a mold base according to the invention has a slightly smaller developed surface area than a conventional container base, leading to a reduction in the volume, and therefore in the weight, of material which, albeit small (typically of the order of 2% by weight), is nonetheless a real reduction.

According to another of its aspects, the invention proposes a molding device for the manufacture, by blow-molding or stretch-blow-molding, of containers, particularly of bottles, made of thermoplastic such as PET, said containers having a body and having a base of the type said petalloid with five feet which are distributed angularly with uniform spacing, which run approximately parallel to the axis of the container and which are separated from one another by radiating valleys the bottoms of which run radially with a convex curvature, which container base connects with the container body in a connection region that is substantially a cylinder of revolution having a diameter Φ of about 85 to 95 mm, which molding device comprises at least one mold consisting of at least three parts including a mold base comprising, for molding said base of the containers, five cavities which are distributed angularly at even distances apart, run approximately parallel to the axis of the mold base and are separated from one another by radiating dorsal fins the crests of which are concave, the bottoms of said cavities being distributed over a substantially circular contour with a given basic diameter D ranging between about 60 and 66 mm, which molding device, being configured according to the invention, is characterized in that the mold base employs the one and/or the other of the features set out above.

BRIEF DESCRIPTION OF THE DRAWINGS

The invention will be better understood from reading the detailed description which follows, which is given with reference to the attached drawings in which:

FIG. 4 is a view in section along the line IV-IV of one part of the mold base of FIG. 1;

FIG. 6 is a three-quarters isometric perspective view from beneath of a base of a container manufactured using the mold base of FIGS. 1 to 5.

DETAILED DESCRIPTION OF THE INVENTION

Figure 1:
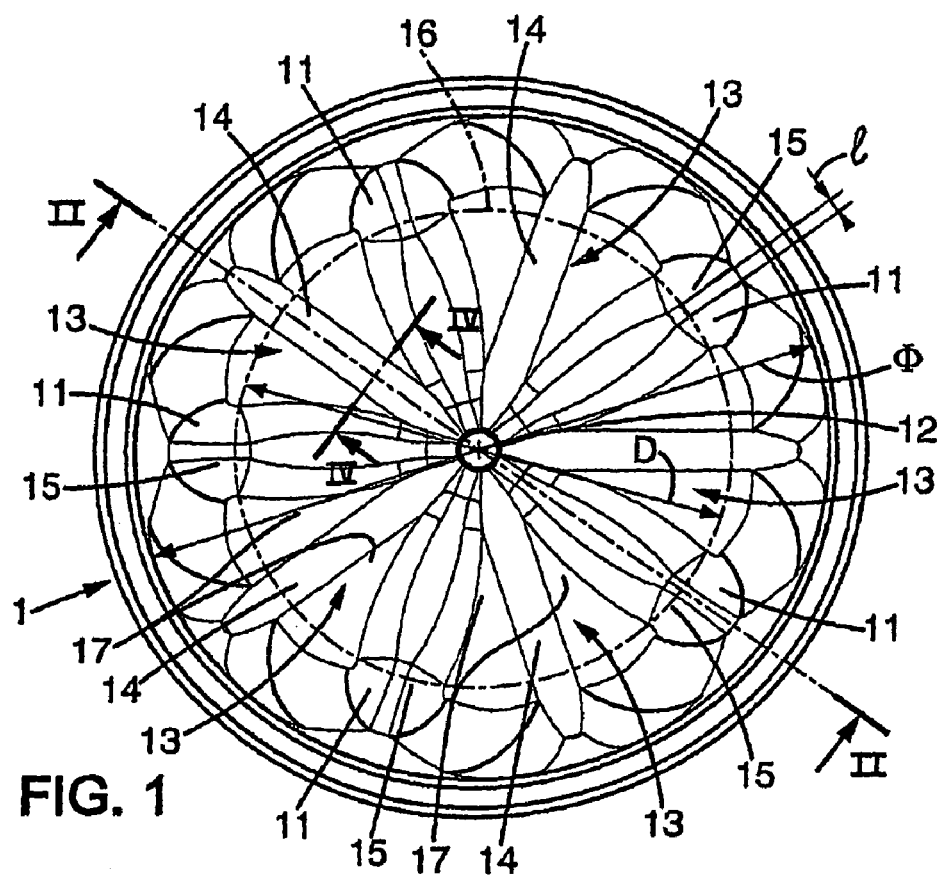
FIG. 1 is a view from above of a blow-molding or stretch-blow-molding mold base designed according to the invention.

Reference is now made to FIGS. 1 to 5 which depict a mold base 1 intended to be fitted to a mold for the manufacture, by blow-molding or stretch-blow-molding, of containers, particularly bottles, made of a thermoplastic such as PET.

As shown in FIG. 6, the containers 2 that are to be manufactured with this mold have a body 3 and have a base 4 of the type known as petalloid having five foot-forming protrusions 5 which are distributed angularly at equal distances apart, which run approximately parallel to the axis 6 of the container and are separated from one another by radiating valleys 7 the bottoms 8 of which run in a convex radial curve. All the valleys 7 converge at the center of the base, which is made in the form of a plateau 10 projecting outwards slightly. The container base 4 is connected to the container body 3 by a connecting region 9 that is substantially a cylinder of revolution having a diameter Φ of about 85 to 95 mm.

With reference now to FIGS. 1 to 5, the mold base 1 comprises, for molding said base 4 of the containers 2, cavities 11 (to form the feet of the base of the containers), there being five of these, which are distributed at uniform angular distances apart (72° apart), which run approximately parallel to the axis 12 of the base 1 of the mold and which are separated from one another by radiating dorsal fins 13 (that is to say by substantially radially elongate projecting parts of the mold base which, in the molded container base, lead to the formation of said valleys). Each dorsal fin 13 has a concave crest 14. The bottoms 15 of the cavities 11 are distributed on a substantially circular contour 16 that has a given basic diameter D of between about 60 and 66 mm, this diameter corresponding to the diameter of the rest contour of the base 4 of the containers (the diameter of the circular contour over which the regions of the feet 5 via which the containers rest on a flat support are distributed).

Figure 2:
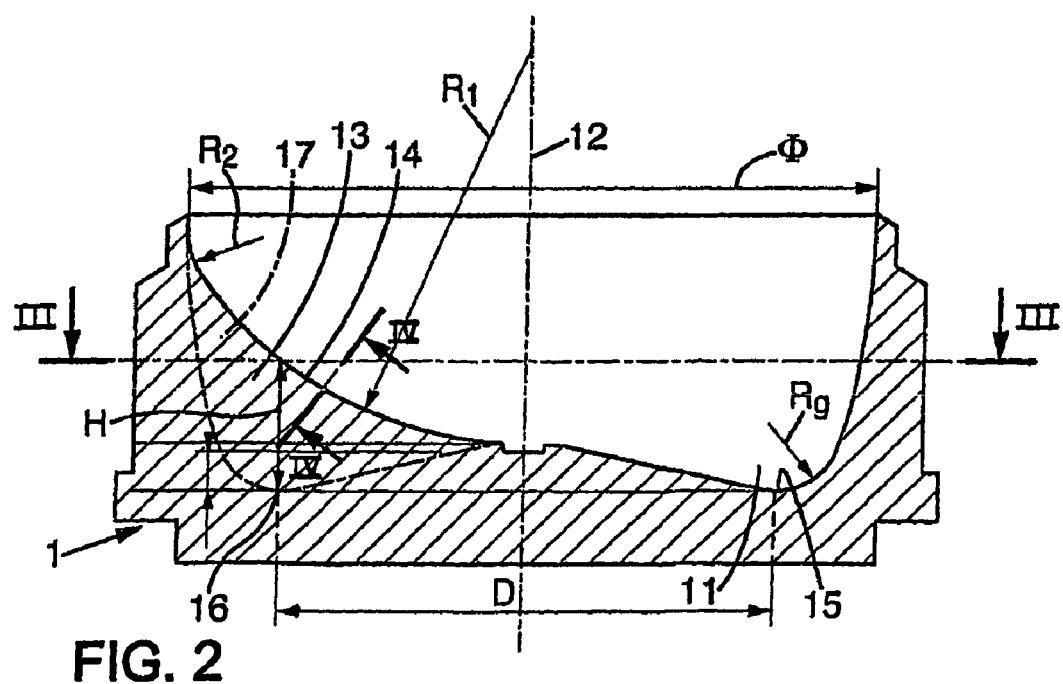
FIG. 2 is a view in diametrical cross-section along the line II-II of FIG. 1.
Figure 3:
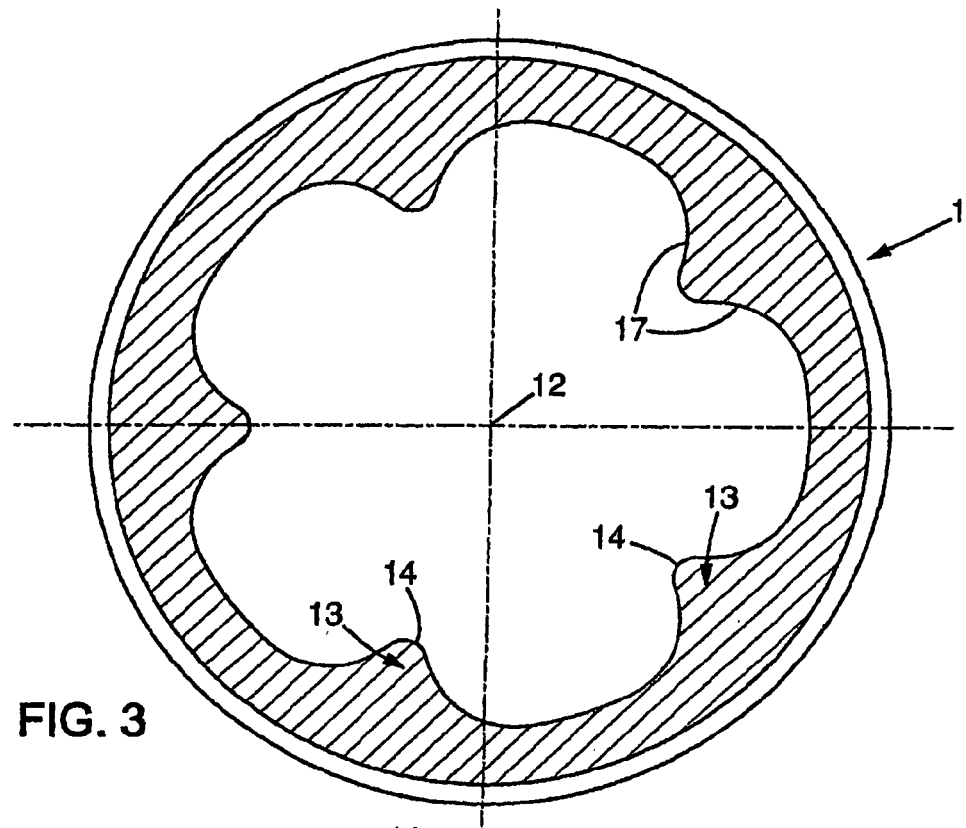
FIG. 3 is a view from above in section along the line III-III of FIG. 2.

According to the invention, the mold base 1 is designed in such a way as to exhibit the combination of following features:
the base 15 of each cavity 11, adapted for forming a bearing surface of a foot 5 of the container 2, has a width l, measured parallel to the periphery, of between about 1.5 and 3.5 mm;

each dorsal fin 13 has a dorsal fin crest 14 radius r of between about 2 and 5 mm;

each dorsal fin 13 has flanks 17 which are concave in an approximately axial direction (that is to say in a substantially right cross section plane as illustrated in FIG. 4) and of which the planes tangential to the origin (that is to say to the place where the rounding of the crest 14 stops) form an angle a of between about 52° and 88°; and the height H of the dorsal fin (height of the crest 14 vertically in line with the contour 16 of diameter D on which the bases 15 of the cavities 11 are distributed, as illustrated in FIG. 2) ranges between about 16.5 and 18 mm.

Figure 5:
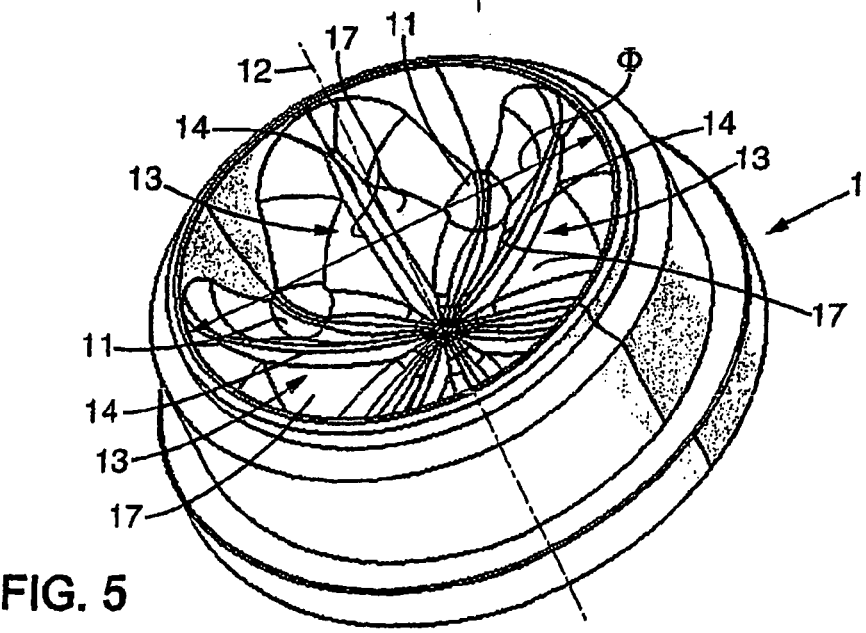
FIG. 5 is a three-quarters perspective view from above of the mold base of FIGS. 1 to 5.

As can be seen in FIG. 1 and FIG. 5, it is desirable for the flanks 17 of the dorsal fins 13 furthermore to be concave in the radial direction so that the corresponding valley flanks of the container bases are curved convexly in three dimensions, that is to say both radially and vertically, thus increasing their strength.

The reduction in dorsal fin height H can be obtained in a simple way by making the crests 14 of the dorsal fins 13 extend over a surface of revolution the cross section of which is substantially in the shape of a basket handle, as can be seen in the depiction of the left-hand half of the mold base 1 given in FIG. 2. The precise shape of this surface of revolution has no appreciable impact insofar as the reduction in height H is significant. In practice, a surface of revolution the cross section of which is a simple geometric construction, such as an ellipse or, as illustrated in FIG. 2, an oval of large radius R1 and small end radii R2, will be chosen. Thus constructed, the surface of revolution, on which the crests 14 of the dorsal fins bear, meets the molding cavity of the body that is a cylinder of revolution tangentially while at the same time having a height shorter than the diameter of this body molding cavity.

Advantageously, provision is made for the cavities to have a radius Rg of between about 5 and 10 mm, so that the corresponding feet of the container bases are appreciably more slender than those of the bases of the prior art.

In a typical example, the following combination of values is provided for a diameter Φ=87.9 mm which is, in particular, the current diameter of 1.5-liter capacity bottles:

l=1.94 mm
r=3.5 mm
a=80°
H=16.7 mm
Rg=8.5 mm

The features according to the invention find an especially preferred application in a molding device for the manufacture, by blow-molding or stretch-blow-molding, of containers 2, particularly of bottles, made of a thermoplastic such as PET, said containers 2 having a body 3 and having a base 4 of the type said petalloid with five feet 5 which are distributed angularly with uniform spacing, which run approximately parallel to the axis 6 of the container 2 and which are separated from one another by radiating valleys 8 the bottoms of which run radially with a convex curvature, which base 4 of the container connects with the body 3 of the container in a connection region 9 that is substantially a cylinder of revolution having a diameter Φ of about 85 to 95 mm, which molding device comprises at least one mold consisting of at least three parts including a mold base 1 comprising, for molding said base 4 of the containers 2, five cavities 11 which are distributed angularly at even distances apart, run approximately parallel to the axis 12 of the mold base 1 and are separated from one another by radiating dorsal fins 13 the crests 14 of which are radially concave, the bottoms 15 of said cavities 11 being distributed over a substantially circular contour 16 with a given basic diameter D ranging between about 60 and 66 mm, which molding device, being designed according to the invention, is equipped with a mold base 1 employing one or more of the features set out above.

The invention claimed is:

1. A mold base for a mold for the manufacture, by blow-molding or stretch-blow-molding, of containers, particularly of bottles, made of a thermoplastic such as PET, said containers having a body and having a base of the type said petalloid with five feet which are distributed angularly with uniform spacing, which run approximately parallel to the axis of the container and which are separated from one another by radiating valleys the bottoms of which run radially with a convex curvature, which base of the container connects with the body of the container in a connection region that is substantially a cylinder of revolution having a diameter Φ of about 85 to 95 mm, said mold base comprising, for molding said base of the containers, five cavities which are distributed angularly at even distances apart, run approximately parallel to the axis of the mold base and are separated from one another by radiating dorsal fins the crests of which are radially concave, the bottoms of said cavities being distributed over a substantially circular contour with a basic diameter D ranging between about 60 and 66 mm, wherein in combination:

the base of each cavity, adapted for forming a bearing surface of a foot of the container, has a width l, measured parallel to the periphery, of between about 1.5 and 3.5 mm;

each dorsal fin has a dorsal fin crest radius r of between about 2 and 5 mm;

each dorsal fin has flanks which are concave in an approximately axial direction and of which the planes tangential to the origin form an angle a of between about 52° and 88°; and the height H of the dorsal fin ranges between about 16.5 and 18 mm.

2. The mold base as claimed in claim 1, wherein the flanks of the dorsal fins are also concave in the radial direction.

3. The mold base as claimed in claim 1, wherein the crests of the substantially concave radial dorsal fins extend over a surface of revolution the cross section of which is substantially in the shape of a basket handle, whereby the dorsal fin height H is reduced.

4. The mold base as claimed in claim 3, wherein the crests of the substantially concave radial dorsal fins extend over a surface of revolution the cross section of which is substantially oval.

5. The mold base as claimed in claim 1, wherein, in combination:

Φ=87.9 mm
l=1.94 mm
r=3.5 mm
a=80°
H=16.7 mm.

6. The mold base as claimed in claim 1, wherein the cavities have a radius Rg of between about 5 and 10 mm.

7. The mold base as claimed in claim 6, wherein the cavities have a radius Rg of about 8.5 mm.

8. A molding device for the manufacture, by blow-molding or stretch-blow-molding, of containers, particularly of bottles, made of thermoplastic such as PET, said containers having a body and having a base of the type said petalloid with five feet which are distributed angularly with uniform spacing, which run approximately parallel to the axis of the container and which are separated from one another by radiating valleys the bottoms of which run radially with a convex curvature, which base of the container connects with the body of the container in a connection region that is substantially a cylinder of revolution having a diameter of about 85 to 95 mm, which molding device comprises at least one mold consisting of at least three parts including a mold base comprising, for molding said base of the containers, five cavities which are distributed angularly at even distances apart, run approximately parallel to the axis of the mold base and are separated from one another by radiating dorsal fins the crests of which are radially concave, the bottoms of said cavities being distributed over a substantially circular contour with a given basic diameter ranging between about 60 and 66 mm, wherein the mold base is configured as claimed in claim 1.

* * * * *